United States Patent
Kubota

[11] Patent Number: 6,142,832
[45] Date of Patent: Nov. 7, 2000

[54] LAMP WIRING STRUCTURE AND SOCKET COUPLING STRUCTURE

[75] Inventor: Mitsuji Kubota, Shizuoka-ken, Japan

[73] Assignee: Yazaki Corporation, Tokyo, Japan

[21] Appl. No.: 09/205,369

[22] Filed: Dec. 4, 1998

[30] Foreign Application Priority Data

Dec. 5, 1997 [JP] Japan .................................. 9-336084

[51] Int. Cl.[7] .......................... H01R 25/00; H01R 27/02; H01R 31/00; H01R 33/88; H01R 33/90
[52] U.S. Cl. ............................................. 439/638; 439/541
[58] Field of Search ................................... 439/638, 623, 439/626, 502, 505, 645, 646, 649, 541

[56] References Cited

U.S. PATENT DOCUMENTS

| | | | |
|---|---|---|---|
| 4,040,709 | 8/1977 | Dola et al. | 439/541 |
| 5,111,368 | 5/1992 | Suzuki et al. | 362/61 |
| 5,228,766 | 7/1993 | Makita et al. | 362/61 |
| 5,971,799 | 10/1999 | Swade | 439/502 |
| 6,036,533 | 3/2000 | Huang | 439/502 |

FOREIGN PATENT DOCUMENTS 8-227765  9/1996  Japan .
9-199246  7/1997  Japan .

*Primary Examiner*—Brian Sircus
*Assistant Examiner*—Michael C. Zarroli
*Attorney, Agent, or Firm*—Finnegan, Henderson, Farabow, Garrett & Dunner, L.L.P.

[57] ABSTRACT

The disclosed lamp wiring structure includes a connector, a plurality of bulb sockets which are electrically connected to the connector and to which lamps are installed, respectively, a plurality of electric wires electrically connecting the connector and the plural bulb sockets, a plurality of lamp containers, and a coupling member covering the plural electric wires and mechanically coupling the connector to the plural bulb sockets. In addition, the disclosed socket coupling structure includes a bulb socket to which a lamp is installed, a flange formed around the bulb socket, a lamp container which has a lamp insertion hole and to which the bulb socket is fixed, a fixed claw formed around the lamp insertion hole of the lamp container and a movable claw formed around the lamp insertion hole of the lamp container. If the bulb socket is pushed into the bulb container while the lamp installed at the bulb socket is inserted into the lamp insertion hole of the lamp container, the flange is engaged with the fixed claw and the movable claw so as to fix the bulb socket to the lamp container.

13 Claims, 5 Drawing Sheets

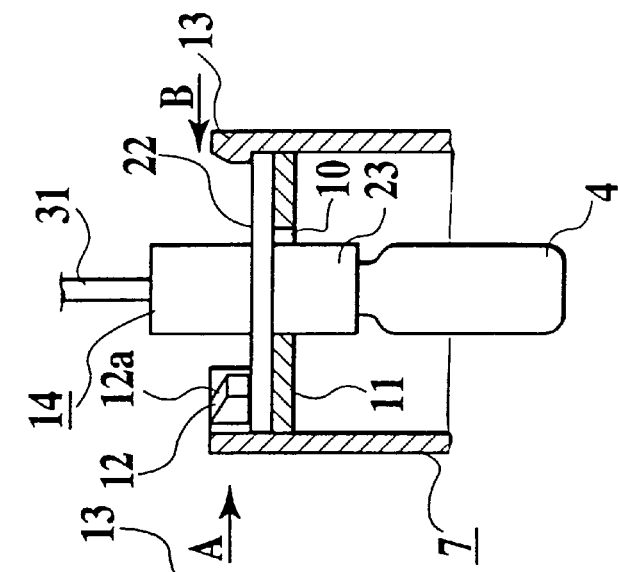
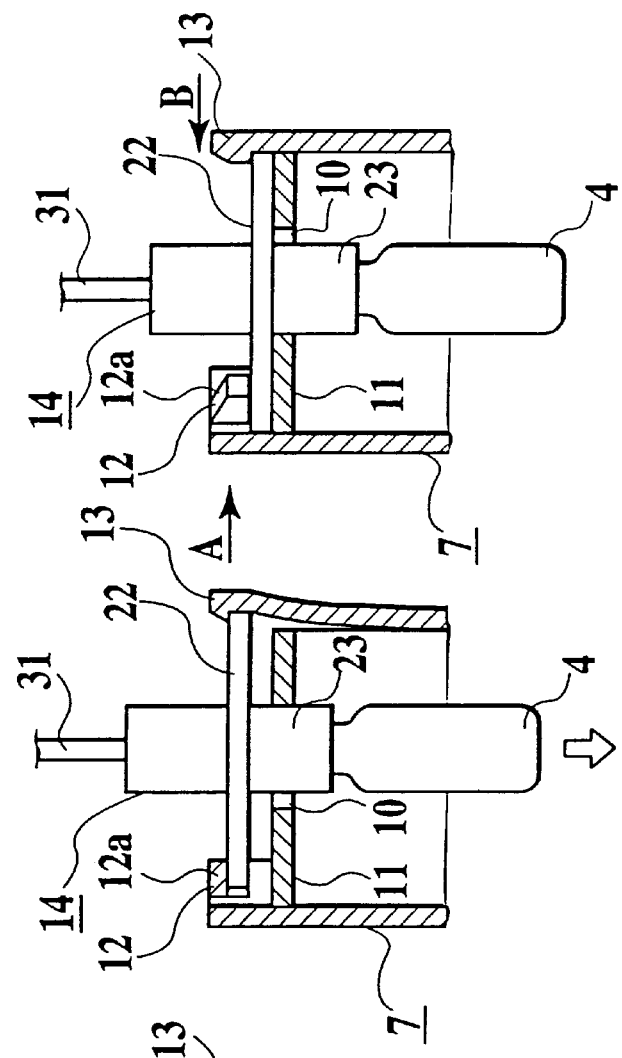
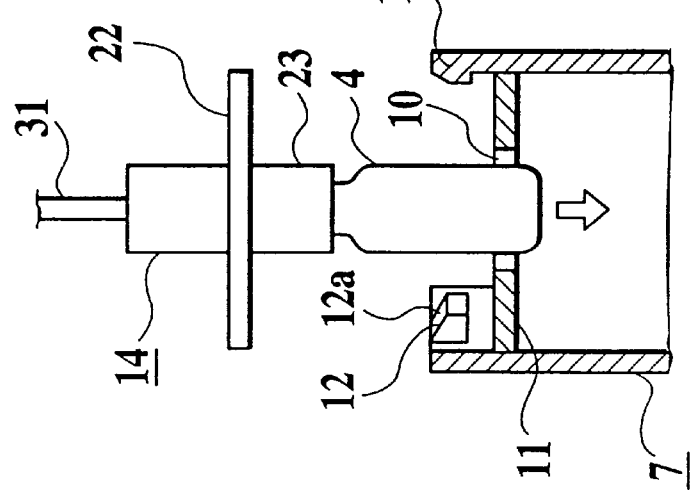

LAMP WIRING STRUCTURE AND SOCKET COUPLING STRUCTURE

BACKGROUND OF THE INVENTION

1. Field of the Invention

The present invention relates to lamp wiring structure and socket coupling structure and relates to, in particular, the wiring structure between a lamp and a connector suitably used for a rear combination lamp, a front combination lamp and the like of a vehicle and the coupling structure of a bulb socket provided with a lamp.

2. Description of the Related Art

Normally, a rear combination lamp of a vehicle comprises a rear combination lamp housing substantially formed entirely by a transparent member and fixed to the rear part of the body of the vehicle, and a lamp unit installed at the rear combination lamp housing and having lamps each of which emitting light toward the rear of the vehicle via the rear combination lamp housing when driving current is applied to the lamp. The lamps of the lamp unit are fixed to the corresponding lamp containers of the rear combination lamp housing, respectively.

Specifically, the rear combination lamp housing of the rear combination lamp is structured mainly by the transparent member such that shapes of end portions thereof are flush with shapes of the rear part of the body of the vehicle in the vicinity of the both end portions of the rear combination lamp housing and such that the lamp containers are formed on the reverse face of the central portion of the rear combination lamp housing. While the rear combination lamp housing contacts with the rear part of body of the vehicle, each of male fasteners is correspondingly inserted into a female fastener provided at the body of the vehicle, thereby fixing the rear combination lamp housing to the body.

Also, the lamp unit of the rear combination lamp typically comprises a bulb socket to which a two-circuit type lamp is installed, a bulb socket to which a single-circuit type lamp is installed, a connector detachably coupled to a connector provided at a harness on the body side of the vehicle, and a wire harness having one end connected to the connector and the other end correspondingly connected to the bulb sockets, respectively. While the connectors are coupled to each other and the two lamps are installed at the corresponding bulb sockets, respectively, the bulb sockets are inserted into and fixed to corresponding lamp containers of the rear combination lamp housing, respectively.

The wire harness of the lamp unit in the rear combination lamp comprises two electric wires for connecting the bulb socket into which the two-circuit type lamp is inserted and the connector of the lamp unit, an electric wire for connecting the bulb socket into which the single-circuit type lamp is inserted and the connector of the lamp unit, the first common electric wire for connecting the bulb sockets to each other and the second common electric wire having one end connected to the first common electric wire in mid course and having the other end connected to the connector. When driving current is outputted from the connector, current is supplied to one of or both of the lamps so as to light the lamp or the lamps.

In the rear combination lamp of this type, however, the lamp unit consists of two bulb sockets, a connector and a wire harness. The number of parts is, therefore, excessively large and it is difficult to realize a cost reduction.

It is also required that the bulb sockets are inserted into the corresponding lamp containers of the rear combination lamp housing, respectively and the lamps are fixed into the corresponding lamp containers, respectively. These operations have to be sequentially conducted, thereby taking much time for installation.

Moreover, in case of a normal bulb socket such as, for example, a bulb socket into which a single-circuit type lamp is inserted, the following operations are required. Namely, a lamp is inserted into a lamp insertion hole formed in the lamp container. Two claws formed at the bulb socket are inserted into grooves provided in the lamp container. The bulb socket is pushed until a flange provided at the bulb socket comes into contact with the reverse face of the lamp container. The bulb socket is then rotated and the two claws formed at the bulb socket are engaged with lock grooves provided in the lamp container, thereby fixing the bulb socket to the lamp container. In this process, both the operation of pushing the bulb socket toward the lamp container and that of rotating the bulb socket have to be conducted, for which, it takes more time for installation.

SUMMARY OF THE INVENTION

It is therefore an object of the present invention to provide a lamp wiring structure capable of effectively reducing the number of parts, effectively improving assembly efficiency and greatly reducing cost.

It is another object of the present invention to provide a socket coupling structure capable of effectively simplifying assembly operations and greatly reducing assembly cost.

In order to obtain the above object, a lamp wiring structure according to the present invention basically comprises a connector provided with a connection pin, a plurality of bulb sockets electrically connected to the connector, a plurality of electric wires for electrically connecting the connector and the plurality of bulb sockets, a plurality of lamp containers, and a coupling member covering the plurality of electric wires and mechanically coupling the connector to the plurality of bulb sockets. Here, each of the bulb sockets is provided with a lamp and a bulb terminal for electrically connecting with the lamp. Each of the plurality of electric wires electrically connects the connection pin provided at the connector and the bulb terminal provided at each of the plurality of bulb sockets. At least one of the plurality of bulb sockets is fixed to each of the plurality of lamp containers.

With this configuration, the connector and a plurality of bulb sockets can be formed integrally with one another, that is, an integral lamp unit can be provided, thereby greatly reducing the number of parts and enabling a fingertip assembly. As a result, it is possible to realize a substantial cost reduction.

More specifically, the coupling member is preferably formed by using an elastic substance, since it can increase the degree of freedom in assembly.

More specifically, the coupling member is preferably generally U-curved plate, since it can enhance working efficiency in assembly in the case of assuming, for example, a combination lamp of a vehicle to which the lamp wiring structure of the present invention is actually and suitably applied.

More specifically, each of the plural wires may have a structure in which it can be disconnected and/or connected according to the type of the lamp.

With such configuration, the electric circuits of the lamp unit can be changed by disconnecting or coupling predetermined portions of the respective electric wires in accordance with the types of the lamps inserted into the bulb sockets, respectively. Therefore, since it is possible to appropriately deal with various purposes in accordance with types of the lamps, the present invention can help to accelerate making more common parts available and realize substantial cost reduction.

Meanwhile, the socket coupling structure according to the present invention comprises a bulb socket to which a lamp is installed, a flange formed around the bulb socket, a lamp container having a lamp insertion hole and to which the bulb socket is fixed, a fixed claw formed around the lamp insertion hole of the lamp container, and a movable claw formed around the lamp insertion hole of the lamp container. If the bulb socket is pushed into the bulb container while the lamp installed at the bulb socket is inserted into the lamp insertion hole of the lamp container, the flange is engaged with the fixed claw and movable claw and the bulb socket is thereby fixed to the lamp container.

With such configuration, the bulb socket can be fixed to the lamp container, that is, to the rear combination lamp housing, only by one action of pushing the bulb socket against the lamp container, that is, the rear combination lamp housing. This makes it possible to greatly simplify assembly process and substantially reduce assembly cost.

More specifically, in view of enhancing the convenience and certainty of the assembly, it is preferable that a plurality of fixed claws are formed to be positioned symmetrically around the lamp insertion hole and that movable claw is positioned to substantially uniformly face the plural fixed claws.

BRIEF DESCRIPTION OF THE DRAWING

FIGS. 7A through 7C are sectional views showing an operational example when a bulb socket of the rear combination lamp shown in FIG. 1 is coupled with the lamp container.

DETAILED DESCRIPTION OF THE PREFERRED EMBODIMENT

The embodiment of the present invention will be described in detail with reference to the accompanying drawings.

First, a lamp wiring structure and a socket coupling structure in this embodiment will be described with reference to FIG. 1.

Figure 1:
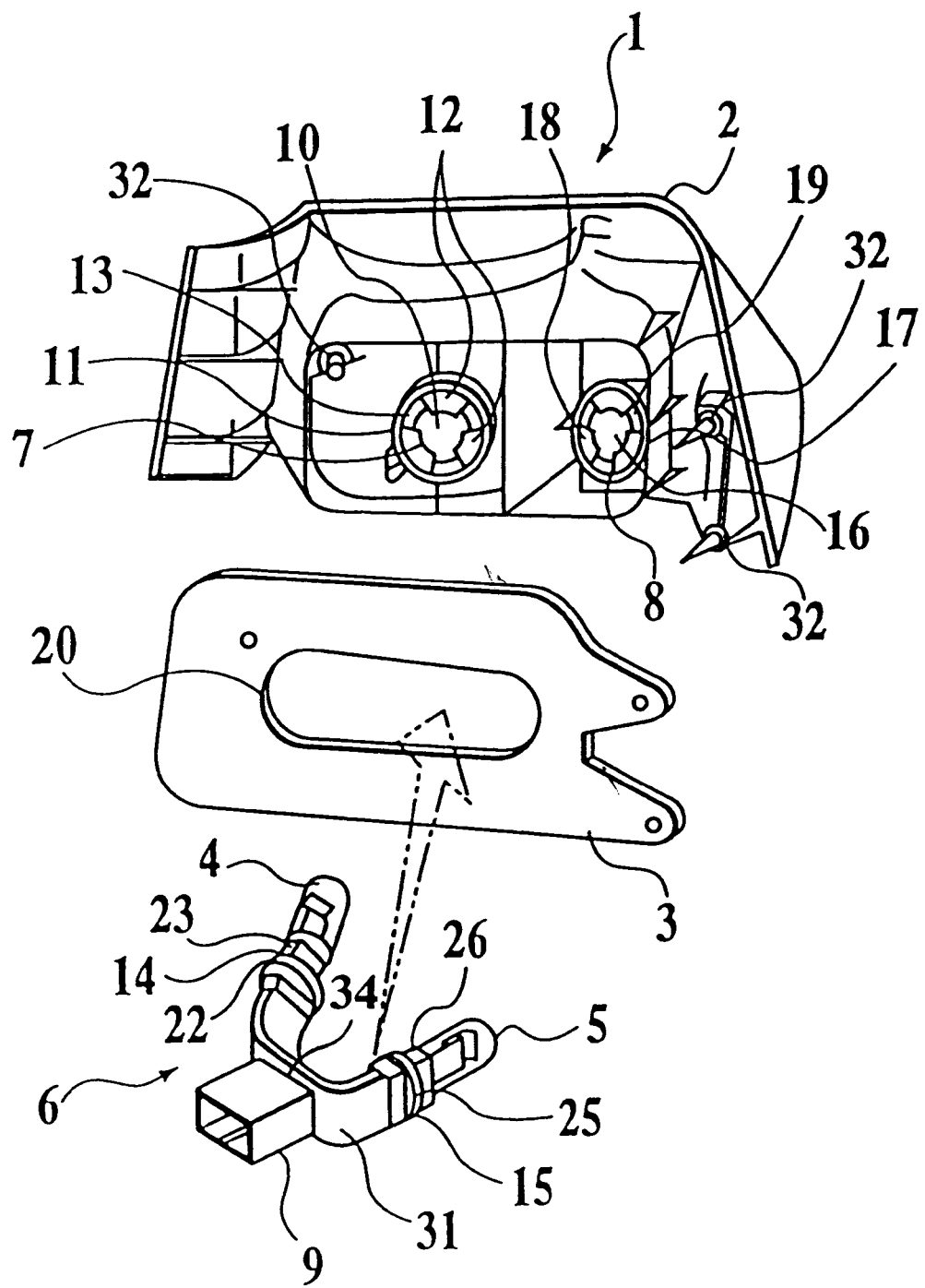
FIG. 1 is an exploded perspective view showing a rear combination lamp according to a lamp wiring structure and a socket coupling structure in an embodiment of the present invention.

FIG. 1 is an exploded perspective view of a rear combination lamp for explaining the schematic of the lamp wiring structure and the socket coupling structure in this embodiment.

A rear combination lamp 1 shown in FIG. 1 includes a rear combination lamp housing 2 mainly formed by a transparent member and fixed to the rear part of the body of a vehicle, a packing 3 installed to the reverse face of the rear combination lamp housing 2, and a lamp unit 6 installed to the rear combination lamp housing 2 and having lamps 4 and 5. The lamps 4 and 5 of the lamp unit 6 are fixed to lamp containers 7 and 8 of the rear combination lamp housing 2, respectively.

The rear combination lamp 1 with the arrangement described above is designed such that when driving current is supplied with a connector 9 connected to a connector (not shown) provided at a body side harness (not shown), one of or both of the lamps 4 and 5 are switched on and light is emitted from the rear combination lamp housing 2 toward the rear of the vehicle.

Specifically, the rear combination lamp housing 2 stated above mainly consists of a transparent member and is formed such that shapes of both end portions of the housing 2 are flush with that of the rear part of the body and that two lamp containers 7 and 8 are provided on the reverse face on the central portion of the housing 2. While the rear combination lamp housing 2 contacts with the rear part of the body via the packing 3, each of male fasteners 32 is correspondingly inserted into a female fastener (not shown) provided at the body and the housing 2 is thereby fixed to the body.

Figure 2:
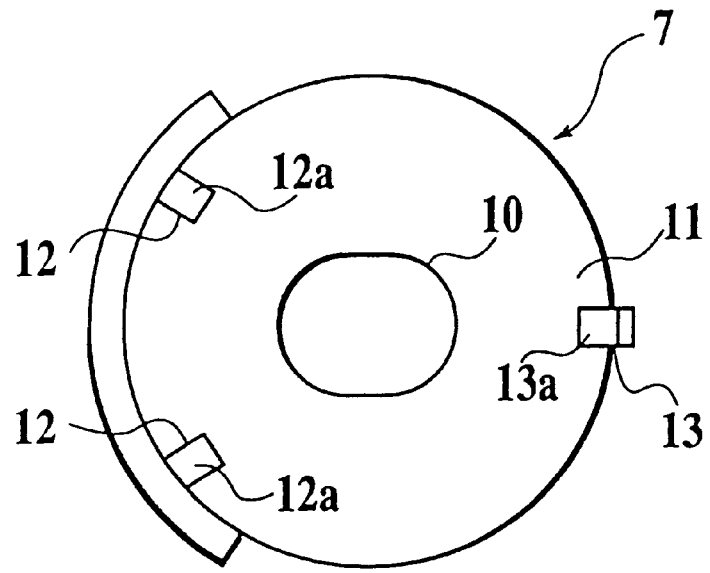
FIG. 2 shows an example of the detailed configuration of a lamp container of the rear combination lamp shown in FIG. 1.
Figure 3:
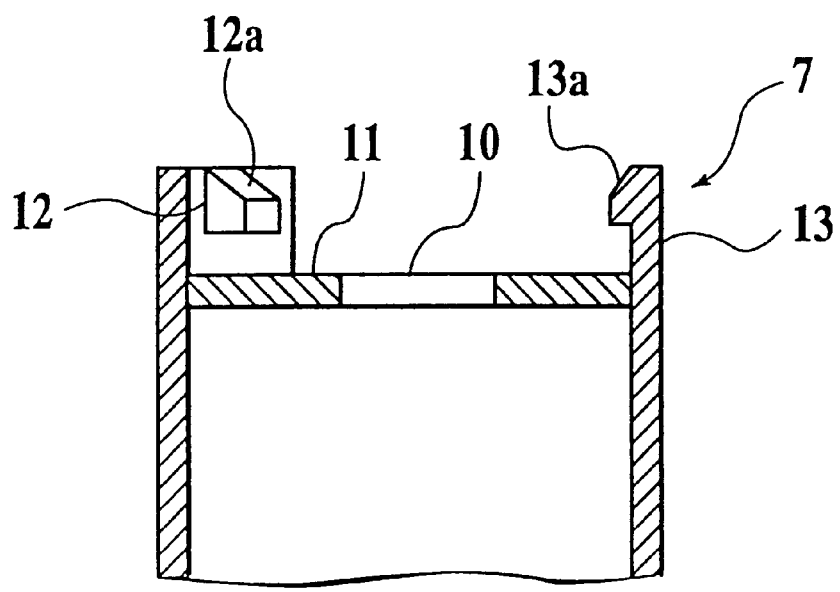
FIG. 3 is a cross-sectional view of the lamp container shown in FIG. 2.

As shown in FIGS. 2 and 3, the lamp container 7 of the rear combination lamp housing 2 includes a lamp fixing plate 11 having an ellipsoidal lamp insertion hole 10 formed at the central portion of the lamp fixing plate 11, two fixed claws 12 each having a tapered surface (or inclined surface) 12a on the upper portion thereof and formed symmetrically to surround the lamp insertion hole 10, that is, formed symmetrically with respect to the major axis of the ellipsoidal lamp insertion hole 10, and a movable claw 13 having a tapered surface (or inclined surface) 13a on the upper portion thereof and positioned to uniformly face the two fixed claws 12, that is, positioned on the extension line of the major axis of the ellipsoidal lamp insertion hole 10. When the lamp 4 of the lamp unit 6 is inserted into the lamp insertion hole 10 and the bulb socket 14 into which the lamp 4 is inserted is pushed toward the lamp fixing plate 11, the bulb socket 14 is held by the fixed claws 12 and the movable claw 13 and then fixed to the lamp fixing plate 11.

Like the lamp container 7, the lamp container 8 of the rear combination lamp housing 2 includes a lamp fixing plate 17 having an ellipsoidal lamp insertion hole 16 formed at the central portion thereof, two fixed claws 18 each having a tapered surface (or inclined surface) formed on the upper portion thereof and formed symmetrically to surround the lamp insertion hole 16 of the lamp fixing plate 17, and a movable claw 19 having a tapered surface (or inclined surface) formed on the upper portion thereof and arranged on the end portion of the lamp fixing plate 17 to uniformly face the two fixing claws 18. When the lamp 5 of the lamp unit 6 is inserted into the lamp insertion hole 16 and the bulb socket 15 into which the lamp 5 is inserted is pushed toward the lamp fixing plate 17, the bulb socket 15 is held by the fixed claws 18 and the movable claw 19 and then fixed to the lamp fixing plate 17.

The packing 3 made of a member such as rubber is formed into plate shape and has a lamp unit insertion hole 20 formed at the central portion thereof. The packing 3 is fixed to the body together with the rear combination lamp housing 2 while being inserted between the reverse face of the rear combination lamp housing 2 and the body.

Figure 4:
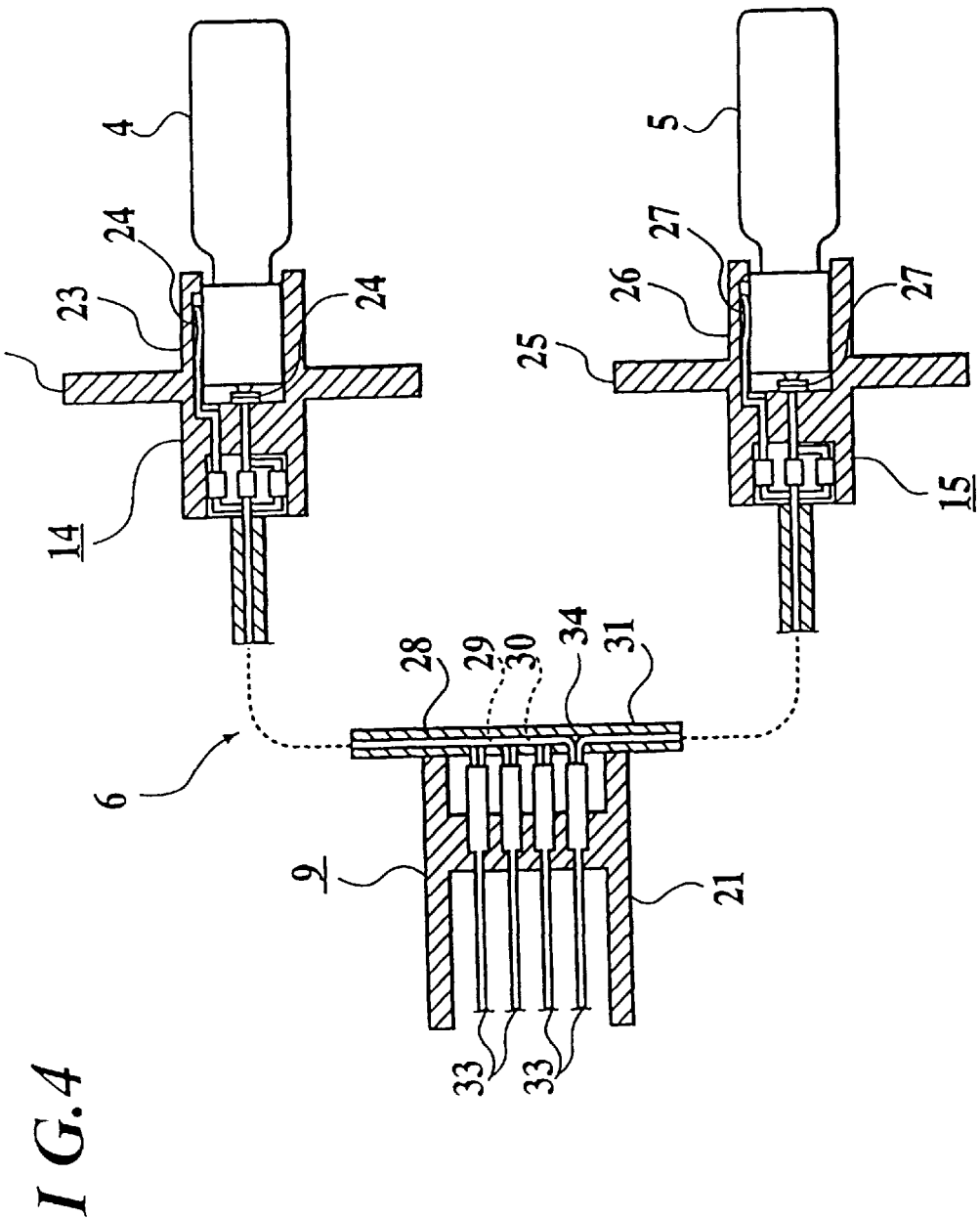
FIG. 4 is a cross-sectional view showing an example of the detailed configuration of a lamp unit of the rear combination lamp shown in FIG. 1.

The lamp unit 6 includes, as shown in FIG. 4, a connector 9 provided with a cylindrical member 21 and a plurality of connection pins 33 arranged such that the tip end portions of the pins 33 protrude into the opening portion of the cylindrical member 21 and detachably coupled to a body side connector (not shown), a bulb socket 14 provided with a cylindrical member 23 having a flange 22 and a plurality of bulb terminals 24 arranged within the cylindrical member 23 and holding the lamp 4 when the lamp 4 is inserted into the cylindrical member 23, and a bulb socket 15 provided with a cylindrical member 26 having a flange 25 and a plurality of bulb terminals 27 arranged within the cylindrical member 26 and holding the lamp 5 when the lamp 5 is inserted into the cylindrical member 26.

In addition, the lamp unit 6 stated above has one end side connected to the bulb terminals 24 provided at the bulb socket 14 by a method such as, for example, pressure welding or crimping and the other end side connected to the bulb terminals 27 provided at the bulb socket 15 by a method such as, for example, pressure welding or crimping, as well. A portion between the both end portions of the lamp unit 6 includes three single-core wires 28, 29 and 30 connected to the corresponding connection pins 33 of the connector 9, respectively, and an elastomer or coupling member 31 provided with a U-shaped plate member covering the single-core wires 28 through 30 and formed such that the central portion thereof is integral with the reverse face of the connector 9 and the end portions are integral with the corresponding bulb sockets 14 and 15, respectively.

In this case, if the lamps 4 and 5 installed at the bulb sockets 14 and 15, respectively are the same in type such as, for example, two-circuit type, then the respective single-core wires 28 through 30 of the lamp unit 6 are applicable to the initial wiring structure.

Figure 5:
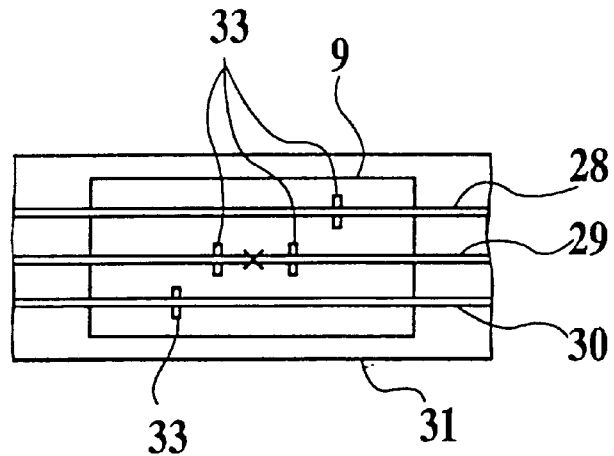
FIG. 5 is a reverse face view showing an example of processing in a case where a two-circuit type lamp and a single-circuit type lamp are inserted into the lamp unit of the rear combination lamp shown in FIG. 1.
Figure 6:
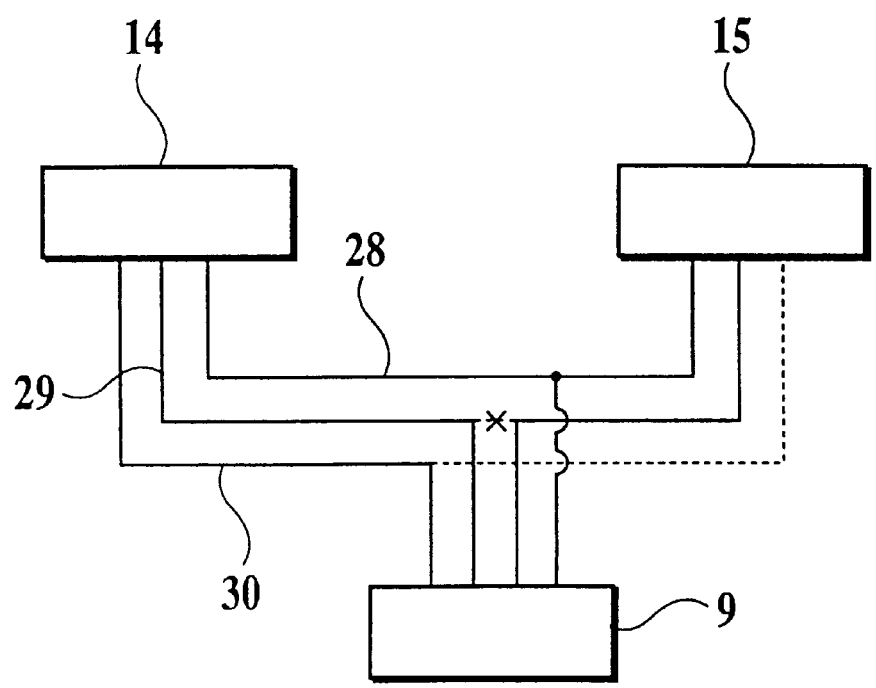
FIG. 6 is a block diagram showing an example of a circuit arrangement when the processing shown in FIG. 5 is conducted.

If the lamps 4 and 5 installed at the bulb sockets 14 and 15, respectively are different in type, i.e., the lamp 4 inserted into one bulb socket 4 is of two-circuit type and the lamp 5 inserted into the other bulb socket 15 is of single-circuit type, for example, then the single-core wire 29 for the second circuit is disconnected at a position indicated by, for example, symbol X and wiring for the bulb socket 15 is made by a single circuit as shown in FIGS. 5 and 6. In FIG. 6, the portion of the single-core wire 30 denoted by a dotted line indicates a wiring portion which is not to be used.

Needless to say, if the lamps 4 and 5 installed at the bulb sockets 14 and 15, respectively, are different in type, not only a certain single-core wire is disconnected but also disconnection and connection may be appropriately combined.

With the above-stated configuration, while the connector 9 is coupled to the connector installed at the body side harness and the lamps 4 and 5 are installed at the corresponding bulb sockets 14 and 15, respectively, the lamps 4 and 5 are inserted into the lamp insertion holes 10 and 16 of the corresponding lamp containers 7 and 8, respectively and the lamp unit 6 per se is pushed against the rear combination lamp housing 2, thereby coupling the bulb sockets 14 and 15 to the lamp containers 7 and 8, respectively.

More specifically, at this time, on the bulb socket 14 side, the lamp 4 installed at the bulb socket 14 is first inserted into the lamp insertion hole 10 of the lamp container 7 as shown in FIG. 7A.

Next, as shown in FIG. 7B, if the lamp unit 6 per se is pushed toward the rear combination lamp housing 2, the flange 22 of the bulb socket 14 is moved in the direction of arrow A by the tapered surfaces 12a of the fixed claws 12 provided at the lamp fixing plate 11 and the movable claw 13 is bent in the direction of arrow A by this flange 22.

As shown in FIG. 7C, thereafter, if the lamp unit 6 is further pushed toward the rear combination lamp unit 2 and the flange 22 passes the fixed claws 12 and the movable claw 13, then the flange 22 is urged in the direction of arrow B by the recovering force of the movable claw 13 and the flange 22 is held by the fixed claws 12 and the movable claw 13, thereby fixing the bulb socket 14 to the rear combination lamp housing 2.

In the meantime, on the bulb socket 15 side, the lamp 5 installed at the bulb socket 15 is first inserted into the lamp insertion hole 16 or the lamp container 8.

Next, when the lamp unit 6 per se is pushed toward the rear combination lamp housing 2, the flange 25 of the bulb socket 15 is moved in the direction of the movable claw 19 by the tapered surfaces of the fixed claws 19 provided at the lamp fixing plate 17 and the movable claw 19 is bent by this flange 25.

If the lamp unit 6 is then pushed further toward the rear combination lamp housing 2 and the flange 25 passes the fixed claws 18 and the movable claw 19, then the flange 25 is urged against the fixed claws 18 side by the recovering force of the movable claw 19 and the flange 25 is held by the fixed claws 18 and the movable claw 19, thereby fixing the bulb socket 15 to the rear combination lamp housing 2.

As described above, in this embodiment, the lamp unit 6 has a structure in which the connector 9 and the bulb sockets 14 and 15 are formed integrally with one another by the plate-shaped elastomer 31. Compared with the conventional lamp unit, therefore, it is possible to greatly reduce the number of parts and, at the same time, to form the lamp unit 6 and the rear combination lamp housing 2 integrally with each other only by pushing the lamp unit 6 toward the rear combination lamp housing 2. This makes possible a fingertip assembly and a substantial reduction in cost.

Furthermore, in this embodiment, if the lamps 4 and 5 inserted into the bulb sockets 14 and 15, respectively are of two-circuit type, it is possible to use the single-core wires 28 through 30 while left intact. If, on the other hand, the two-circuit type lamp is inserted into one bulb socket 14 and the single-circuit type lamp is inserted into the other bulb socket 15, then it is enough to disconnect the single-core wire 29 in the middle of the connection pin 33. Owing to this, irrespectively of the types of the lamps 4 and 5 to be inserted into the bulb sockets 14 and 15, respectively, only one lamp unit 6 suffices. As a result, it is possible to accelerate making more common parts available and to thereby realize a cost reduction.

Moreover, in this embodiment, after the lamps 4 and 5 inserted into the bulb sockets 14 and 15 are inserted into the lamp insertion holes 10 and 16 of the lamp containers 7 and 8, respectively, the bulb sockets 14 and 15 can be fixed to the rear combination lamp housing 2 side lamp containers 7 and 8, respectively, only by one action or a fingertip operation of further pushing the lamp unit 6 per se into the rear combination lamp housing 2. As a result, it is possible to greatly simplify assembly process and to substantially reduce assembly cost.

The embodiment has illustrated the lamp wiring structure and the socket coupling structure, taking the rear combination lamp 1 as an example. It goes without saying that they should not be limited to the rear combination lamp 1, but is also applicable to other vehicle lamp equipment such as a front combination lamp.

The embodiment has also illustrated that one bulb socket 14 corresponds to the lamp container 7 of the rear combination lamp 1 and one bulb socket 15 corresponds to the lamp container 8 thereof. It is of course possible to fix a plurality of bulb sockets to one lamp container as required.

Further, although description has been given to a case where the number of fixed claws is two and that of movable claws is one in this embodiment, they should not limited thereto.

What is claimed is:

1. A lamp wiring structure comprising:

a connector provided with a connection pin;

a plurality of bulb sockets electrically connected to said connector, each of said bulb sockets capable of securing a lamp, and a bulb terminal electrically connected to said lamp;

a plurality of electric wires electrically connecting said connector to said plurality of bulb sockets, each of said plurality of electric wires also electrically connecting said connection pin provided at said connector to said bulb terminal provided at each of said plurality of bulb sockets;

a plurality of lamp containers, at least one of said plurality of bulb sockets fixed to each of said plurality of lamp containers; and a coupling member with a generally elastic U-curved plate shape covering said plurality of electric wires and having first and second portions capable of extending in generally opposing directions with respect to the connector for mechanically coupling said connector to said plurality of bulb sockets.

2. A lamp wiring structure comprising:

a connector provided with a connection pin;

a plurality of bulb sockets electrically connected to said connector, each of said bulb sockets capable of securing a lamp, and a bulb terminal electrically connected to said lamp;

a plurality of electric wires electrically connecting said connector to said plurality of bulb sockets, each of said plurality of electric wires also electrically connecting said connection pin provided at said connector to said bulb terminal provided at each of said plurality of bulb sockets and, said plurality of electric wires are electrically connected in accordance with said lamp;

a plurality of lamp containers, at least one of said plurality of bulb sockets fixed to each of said plurality of lamp containers; and a coupling member covering said plurality of electric wires and having first and second portions capable of extending in generally opposing directions with respect to the connector for mechanically coupling said connector to said plurality of bulb sockets.

3. A socket coupling structure, comprising:

a bulb socket to which a lamp can be attached;

a flange formed on said bulb socket;

a lamp container having a lamp insertion hole, said bulb socket fixed to said lamp container;

at least one fixed claw formed near a periphery of said lamp insertion hole and on said lamp container; and at least one movable claw formed near a periphery of said lamp insertion hole and on said lamp container, wherein when said bulb socket is pushed into said bulb container while said lamp is attached to said bulb socket and inserted into said lamp insertion hole of said lamp container, said flange is engaged with said fixed claw and said movable claw, and said bulb socket is thereby fixed to said lamp container fixing plate.

4. The socket coupling structure according to claim 3, wherein said fixed claw is positioned symmetrically around said lamp insertion hole, and said movable claw is positioned to substantially face said fixed claws.

5. A lamp wiring structure according to claim 2, wherein said connector is provided with at least one connecting pin.

6. A lamp wiring structure according to claim 2, wherein said coupling member has a generally U-shaped configuration.

7. A lamp wiring structure according to claim 2, wherein said coupling member has a generally plate-shaped configuration.

8. A lamp wiring structure according to claim 2, wherein said plurality of electric wires are disconnected in accordance with a type of said lamp.

9. A lamp wiring structure according to claim 2, wherein a plurality of bulb sockets are fixed to each lamp container.

10. A lamp structure according to claim 2, wherein said lamp is a two-circuit type.

11. A lamp wiring structure according to claim 2, wherein said lamp is a single-circuit type.

12. A lamp wiring structure according to claim 3, wherein the number of fixed claws is two and number of moveable claws is one.

13. The socket coupling structure according to claim 3, wherein said flange completely circumscribes said bulb socket.

* * * * *

UNITED STATES PATENT AND TRADEMARK OFFICE
CERTIFICATE OF CORRECTION

PATENT NO.    : 6,142,832
DATED         : November 7, 2000
INVENTOR(S)   : Mitsuji Kubota Page 1 of 1

It is certified that error appears in the above-identified patent and that said Letters Patent is hereby corrected as shown below:

Column 8, claim 10,
Line 38, after "lamp", insert -- wiring --.

Column 8, claim 12,
Line 43, "moveable" should read -- movable --.

Signed and Sealed this

Sixteenth Day of April, 2002

*Attest:*

JAMES E. ROGAN
*Attesting Officer*      *Director of the United States Patent and Trademark Office*